United States Patent
Davis

(10) Patent No.: US 7,386,573 B2
(45) Date of Patent: Jun. 10, 2008

(54) MEDIA FILE ORGANIZATION FOR SHUFFLED PLAYBACK

(75) Inventor: Darren R. Davis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 11/197,077

(22) Filed: Aug. 4, 2005

(65) Prior Publication Data

US 2007/0038669 A1 Feb. 15, 2007

(51) Int. Cl.
*G06F 17/30* (2006.01)
*G06F 17/00* (2006.01)

(52) U.S. Cl. .................. 707/104.1; 707/100
(58) Field of Classification Search ............... 707/104.1
See application file for complete search history.

(56) References Cited

U.S. PATENT DOCUMENTS

2004/0221311 A1* 11/2004 Dow et al. .................. 725/52
2007/0053268 A1* 3/2007 Crandall et al. ......... 369/53.31

\* cited by examiner

*Primary Examiner*—Tony Mahmoudi
(74) *Attorney, Agent, or Firm*—Senniger Powers LLP

(57) ABSTRACT

Media file organization for shuffled playback or rendering. One or more sets of media files available to be rendered are defined. Each of the defined sets represents one or more contiguous media files. A media file is randomly selected from one of the defined sets to be rendered. The one or more sets of media files are redefined, each of said redefined sets representing one or more remaining media files to be rendered. Another media file is randomly selected from one of the redefined sets for rendering. A packed array, sized according to the number of sets of contiguous media files, is used for allocating memory and identifying unplayed media files.

20 Claims, 8 Drawing Sheets

MEDIA FILE ORGANIZATION FOR SHUFFLED PLAYBACK

BACKGROUND

Due to recent advances in technology, computer users are now able to enjoy many features that provide an improved user experience, such as playing various media and multimedia content on personal, laptop, or handheld computers, as well as cellular phones and other portable media devices. For example, most computers today are able to play compact discs (CDs) and have an internet connection capable of streaming and downloading audio and video so users can enjoy their favorite media while working on their computers. Many computers are also equipped with digital versatile disc (DVD) drives enabling users to watch movies.

In some multimedia environments, a computer has access to a computer-readable medium storing media files such as Moving Picture Experts Group audio layer-3 (MP3) files and WINDOWS MEDIA technologies audio (WMA) and video files. The computer typically organizes the media files into playlists when the media files are rendered on a computer by a media player application.

Users often desire to play back a particular set of digital media files in a random order, hopefully without repeating any of the media files, until all available tracks are played. For example, a user may use a random or shuffle playback feature for playing the tracks of a music recording album in a random order rather than the original order. The user may also use random or shuffle playback for rendering a collection of image files, such as a random photo slide show.

Traditional implementations create random or shuffle playback of music files by preparing a pre-randomization of all of the music files into a "playlist" and playing the music files in a linear order from the list. This type of traditional approach, while guaranteeing the first two randomly selected music files are consistently random with easy traversal, perform poorly when the number of available music files changes. As such, the shortcomings of the pre-randomization implemention require reshuffling or a reconstruction of a new pre-randomization list which, in its simplest implementation, results in a loss of the historical data and causes music files to be repeated before the entire list has been played once. Such an implementation could even lead to the same music file being played twice in a row.

Other conventional techniques maintain status data, such as played or unplayed, for each music file. For example, a flag may be used for each music file to indicate whether or not the item has been played before a music file with an unplayed flag is randomly selected. This use of an "already played" flag in a file's state data in this approach suffers tremendous disadvantage by requiring a CPU-intensive search to find a next music file to be played. In this implementation, typically a random location in the list is chosen and that file is checked to see if it has been played. If it has not been played, then the file is chosen and played. If it has been played, then the random selection is repeated until an unplayed item is located. It is possible to construct situations in which this random selection implementation can search infinitely and never find an unplayed item.

In yet another known implementation, a list of music files yet to be played is maintained and a music file is selected from the list as needed. This approach performs a relatively easy "one hop" random selection to find the next music file to play and allows for easy addition of new music files to be shuffled. This traditional implementation, however, requires a large initial amount of memory to track the unplayed music files. This is undesirable, especially for memory-constrained devices, because it requires an immediate static allocation of a large amount of memory space to accommodate the unplayed music file list. For large lists of music it is possible to construct a scenario where sufficient memory is not available to accommodate this initial allocation thus placing an artificial limit on the size of the playlist that can be shuffled.

SUMMARY

Embodiments of the invention overcome the shortcomings of known approaches and implementations by organizing media files in a "packed array" to accommodate constant changes and limitations of a memory-constrained computing device. Moreover, aspects of the invention enhance the efficiency of random or shuffle rendering of all types of media files by expanding algorithmic complexity of random playback.

Embodiments of the invention also provide an efficient organization of media files for random playback to accommodate changes to the collection of media files to be processed such that dynamically adding or removing media files by the user will not adversely affect the operations of random playback. As such, aspects of the invention enhance the scalability of the random playback, particularly on memory constrained devices.

Other features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
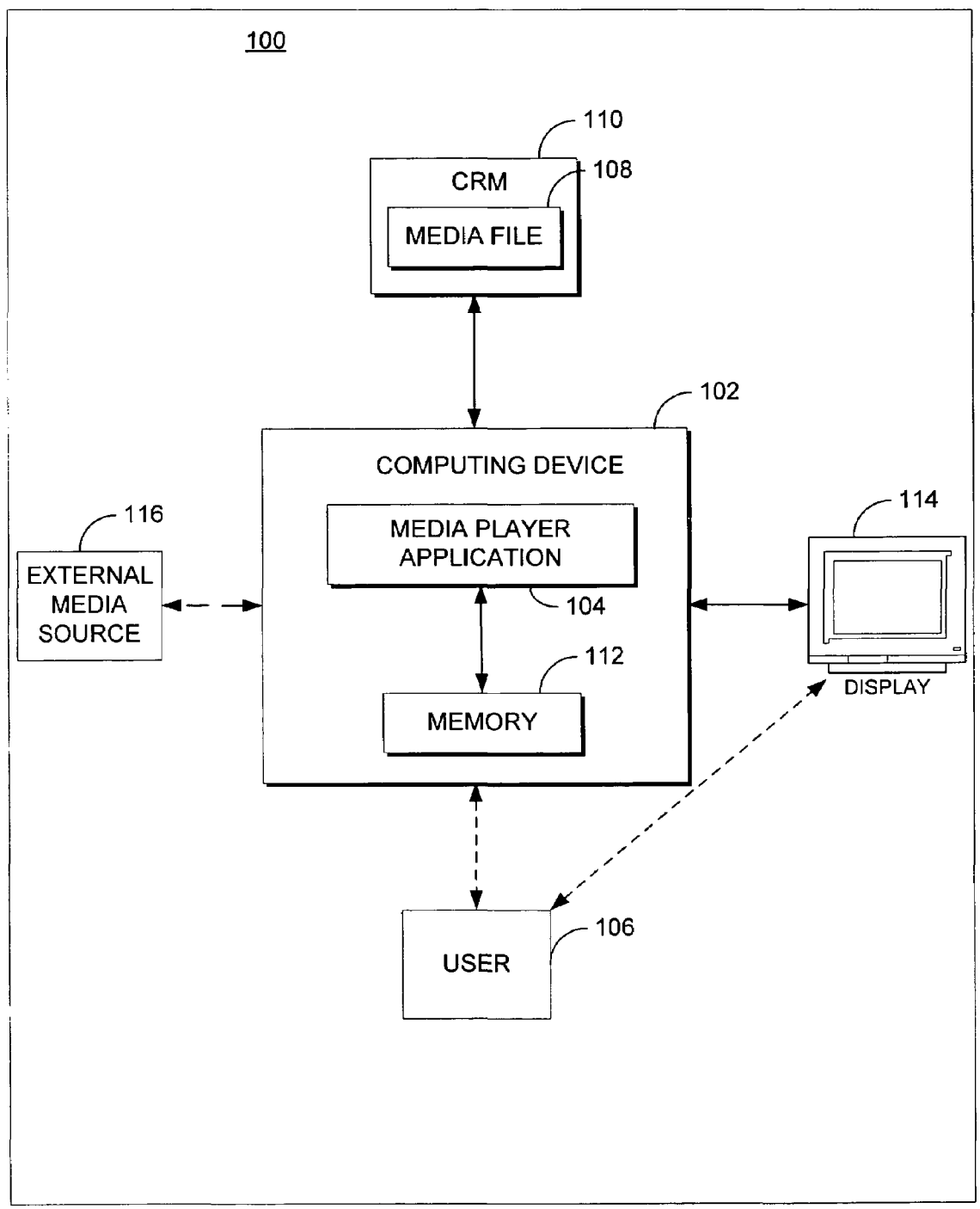
FIG. 1 is an exemplary embodiment illustrating one example of a suitable computing system of organizing media files for rendering according to a shuffled playback according to an embodiment of the invention.

Referring first to FIG. 1, a block diagram illustrates an exemplary system 100 for organizing media files for rendering according to a shuffled playback. In this embodiment, the system 100 includes a computing device 102 that executes a media player application (MPA) 104. The MPA 104 may be any suitable rendering program that is configured to play digital media so that a user can experience the content embodied on the media either audibly or visually (through a display 114) or both. For example, a suitable MPA 104 includes a CD media player application, a digitally-compressed-file player application, a DVD media player application, an image rendering application, and/or a motion picture file rendering application. Executing MPA 104 in the illustrated embodiment enables a user 106 to access one or more digital media files 108 on a computer-readable medium (CRM) 110 such as a compact disc, hard drive, network server, or other suitable computer storage media. The MPA 104 also accesses, retrieves, and stores media files 108 in its memory area 112. In one embodiment, the computing device 102 may be a portable media player (such as a Moving Picture Experts Group audio layer-3 (MP3) player), a cellular phone, a smartphone, a personal digital assistant (PDA), and/or other digital media rendering device. The computing device 102 also includes a processor (not shown) for executing computer-executable instructions, routines, codes, applications, such as MPA 104, and the like.

Still referring to FIG. 1, computing device 102 may also access an external media source 116, such as a flash card, Universal Serial Bus (USB) drive/card, a wireless network storage, and the like, for retrieving media files 108. In other words, it is to be understood that aspects of the invention may be used to shuffle media files 108 from a local library (e.g., stored in a PDA's built-in memory) or a remote library (e.g., stored in an external memory card for use with the PDA).

In organizing media files 108 for rendering according to a shuffled playback, MPA 104 arranges or has media files 108 arranged in a contiguous sequence. For example, MPA 104 arranges media files 108 in a contiguous sequence according to a numerical value from 0 to N−1, where N is the number of files to be shuffled and rendered (i.e., the files in a user's playlist). In one embodiment, MPA 104 defines one or more sets of media files 108 available to be rendered, and each of the defined sets representing one or more contiguous media files 108. In this embodiment, the one or more sets of media files 108 are represented by a "packed array". For example, the "packed array" may be a derivative of the traditional sparse array data structure where an array is used instead of a pointer to track each of the media file2 108 in the defined sets.

There are many ways to represent a list of media files 108 in memory 112. One known approach is to allocate a contiguous block of memory space and have a one to one mapping between the media files 108 identified in the list and the contents in memory 112. For example, a block of memory space may be allocated to store a list of the integers from 1 to 1000 (or 0 to 999) to hold 1000 numerical elements. Each numerical element is initialized from the beginning to the end of the list with the integers 1 to 1000. In this approach, it is relatively easy to access any of these elements in terms of the processor efficiency (e.g., multiplying (N−1) by the size of the numerical element and then adding the product to the base pointer of the memory allocation permits access to the Nth element in the list). However, the disadvantage of this approach is once the list of media files is modified due to adding and/or removing of media files from the list, searching of media files on the list becomes more complicated, especially when the list is not sorted; a method of binary search on a sorted list is needed to optimize the lookup of media files 108. The processor's performance may be optimized to a $O(\log_2 N)$ performance when binary search is performed on a sorted list. For example, $O(\log_2 N)$ is a mathematical expression to indicate a measure of processing time or memory access time needed to execute a set of computer-executable instructions or codes. In this example, embodiments of the invention achieves a performance level of $O(\log_2 N)$, which is a function of the base 2 logarithm of N numbers, where N represents the number of media files to be shuffled.

Figure 2A:
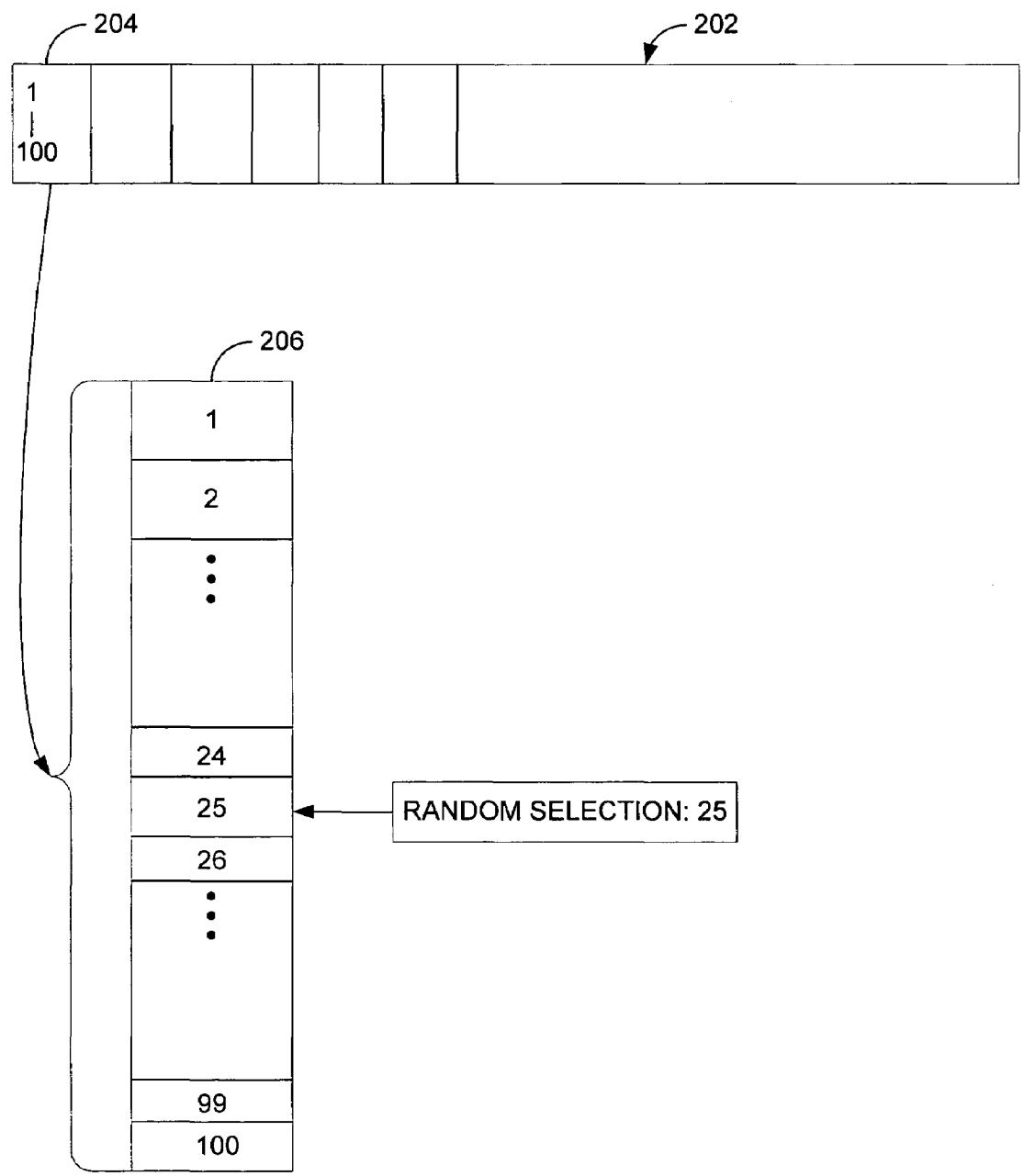
FIGS. 2A-2E are exemplary diagrams illustrating organizing media files using a packed array for a shuffled playback according to an embodiment of the invention.
Figure 2B:
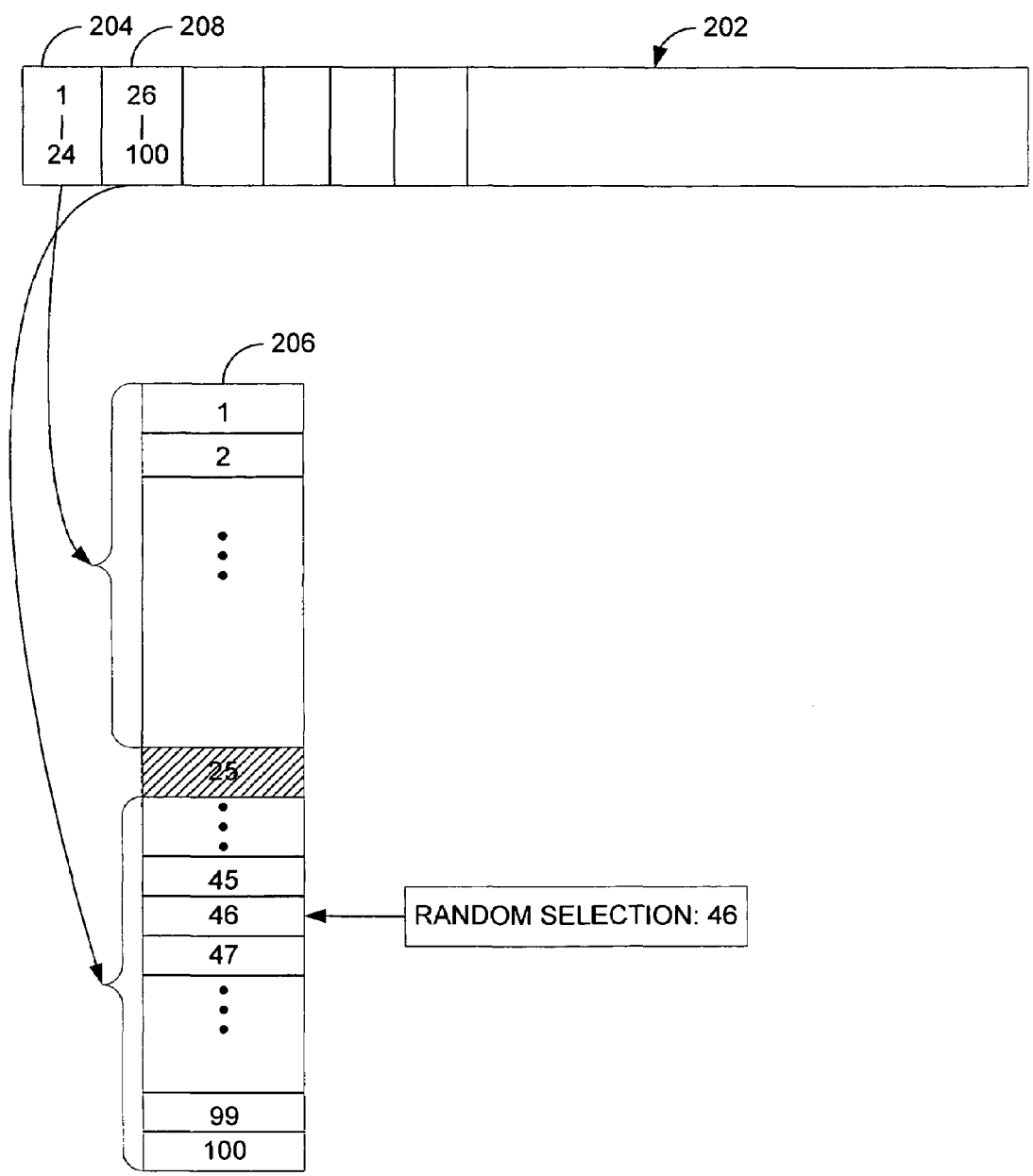
Figure 2C:
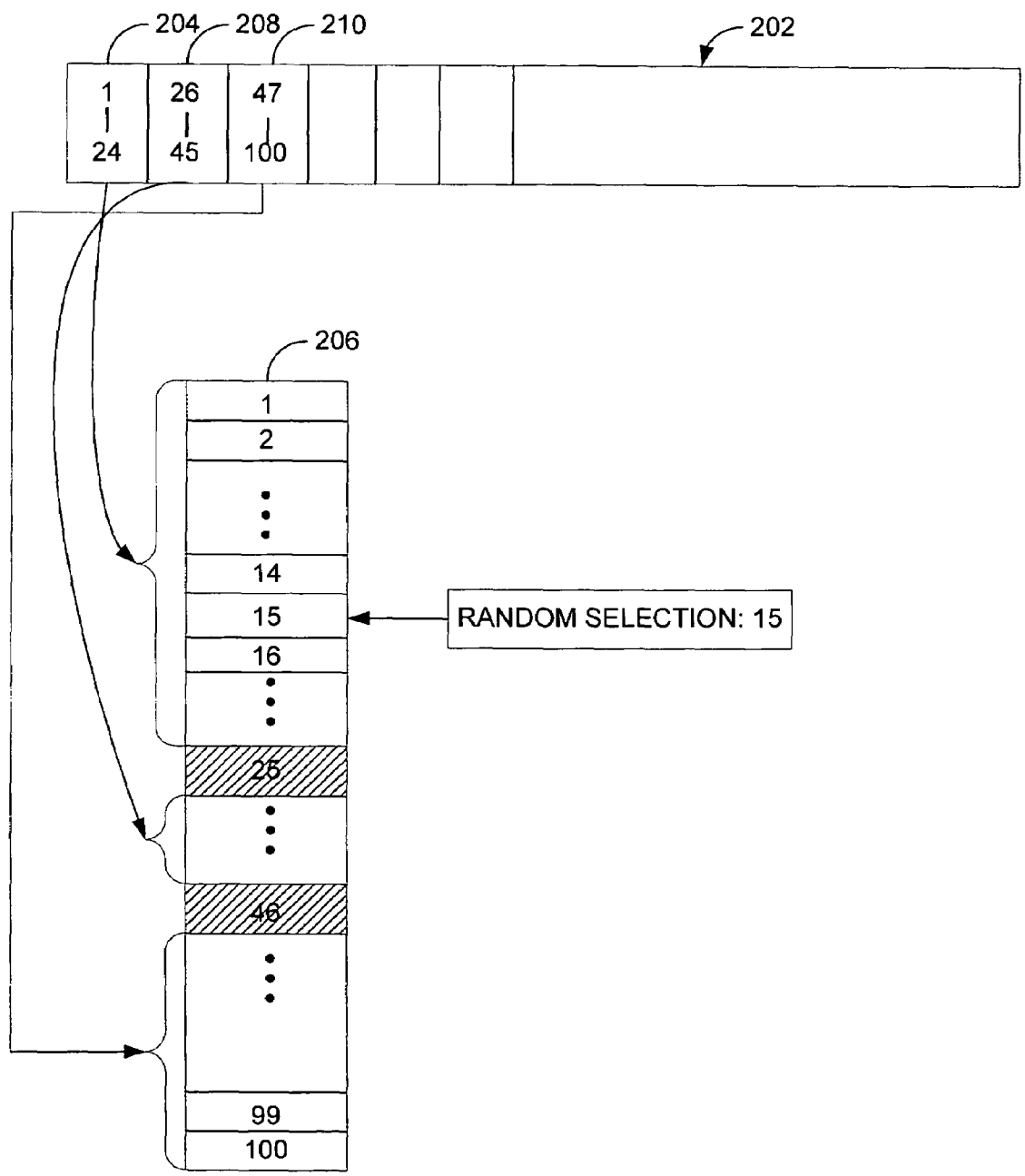

FIGS. 2A-2C are exemplary diagrams illustrating organizing media files 108 using a packed array for a shuffled playback according to an embodiment of the invention. In particular, FIG. 2A illustrates a packed array 202 for organizing media files for random rendering. In one embodiment, MPA 104 allocates memory spaces for the packed array 202 in memory 112 to organize media files 108 for rendering according to a shuffled playback feature. For example, in this approach, contiguous media files 108 in the CRM 110 are represented by a single entry in the defined sets rather than by one entry for each media file. In order to represent the integers from 1 to 100 (or 0 to 99), a block of memory space in memory 112 is allocated to hold two numerical elements. As illustrated example in FIG. 2A, a block 204 indicates two numerical elements: 1 and 100. As such, embodiments of the invention efficiently represent a list 206 of a total number of media files 108 with a minimum amount of memory space needed (i.e., two numerical elements) in memory 112 of computing device 102. This reduced use of memory to represent media files 108 is especially desirable in a computing device where its memory space is limited, such as a memory-constrained device (e.g., cellular phone, MP3 player, and the like).

Next, a media file 108 is randomly selected from the list 206 for playback. In the illustrated example in FIG. 2A, the media file 108 represented by a numerical value "25" is randomly selected. In other words, the 25th media file 108 identified in the list 206 is selected for playback in this example. The MPA 104 next redefines one or more sets of media files to be rendered. Referring now to FIG. 2B, a new block 208 is created. In this illustrated embodiment, one or more packed blocks may be used to represent a list with noncontiguous media files. In other words, each new block 208 represents a list of contiguous media files and they are connected or related together as an array (e.g., packed array 202) in memory. For example, block 204 represents the integers 1 to 24 while the block 208 represents integers 26 to 100. The block 204 would be initialized to a starting index of 1 with a count of 24 and block 208 would be initialized with 26 and a count of 74 (i.e., 100). Once again, this embodiment exemplifies saving a considerable amount of memory space by using four numerical elements (i.e., two in block 204 and block 208) instead of allocating 99 numerical units to represent the remaining media files 108 individually.

In a further example, FIG. 2C illustrates allocating a third block 210 after another media file is randomly selected (i.e., 46 in the example) from list 206. As such, block 204 now represents the integers 1 to 24, block 208 represents the integers 26 to 45, and the block 210 represents 47 to 100.

In one embodiment, in terms of overall memory efficiency, the worst case for the packed array implementation uses twice as much memory space as needed according to the simple contiguous memory case. For example, suppose MPA 104 randomly selects all odd or even from 1 to 100. The MPA 104 would be required to allocate 50 individual packed blocks (e.g., block 204 or block 208) each with an even or odd number as the index and each with a count of 1. Although it may appear that this approach does not optimally perform better than other approaches, embodiments of the invention allocate memory space for the blocks (e.g., block 204) in the packed array 202 as needed. In addition, a randomization function capable of generating all even numbers or all odd numbers from a list has negative properties as a randomization function. This makes achieving this situation more difficult. In addition, instead of initially allocating memory spaces for all media files 108 in the CRM 110 or in external media source 116, aspects of the invention effectively handle allocations of memory space such that memory demand increases as playback proceeds rather then requiring a large amount of memory to start playback. This allows MPA 104 to shuffle the media files 108 in a consistently random order, (i.e., no two rendering/playback sessions render media files 108 in the same order) while making traversing of list 206 easy by allocating memory space as needed. In addition, adding or removing tracks from list 206 by user 106 would seamlessly be incorporated into the random or shuffled playback without creating additional burden on computing device 102 or processor processing time.

Figure 2D:
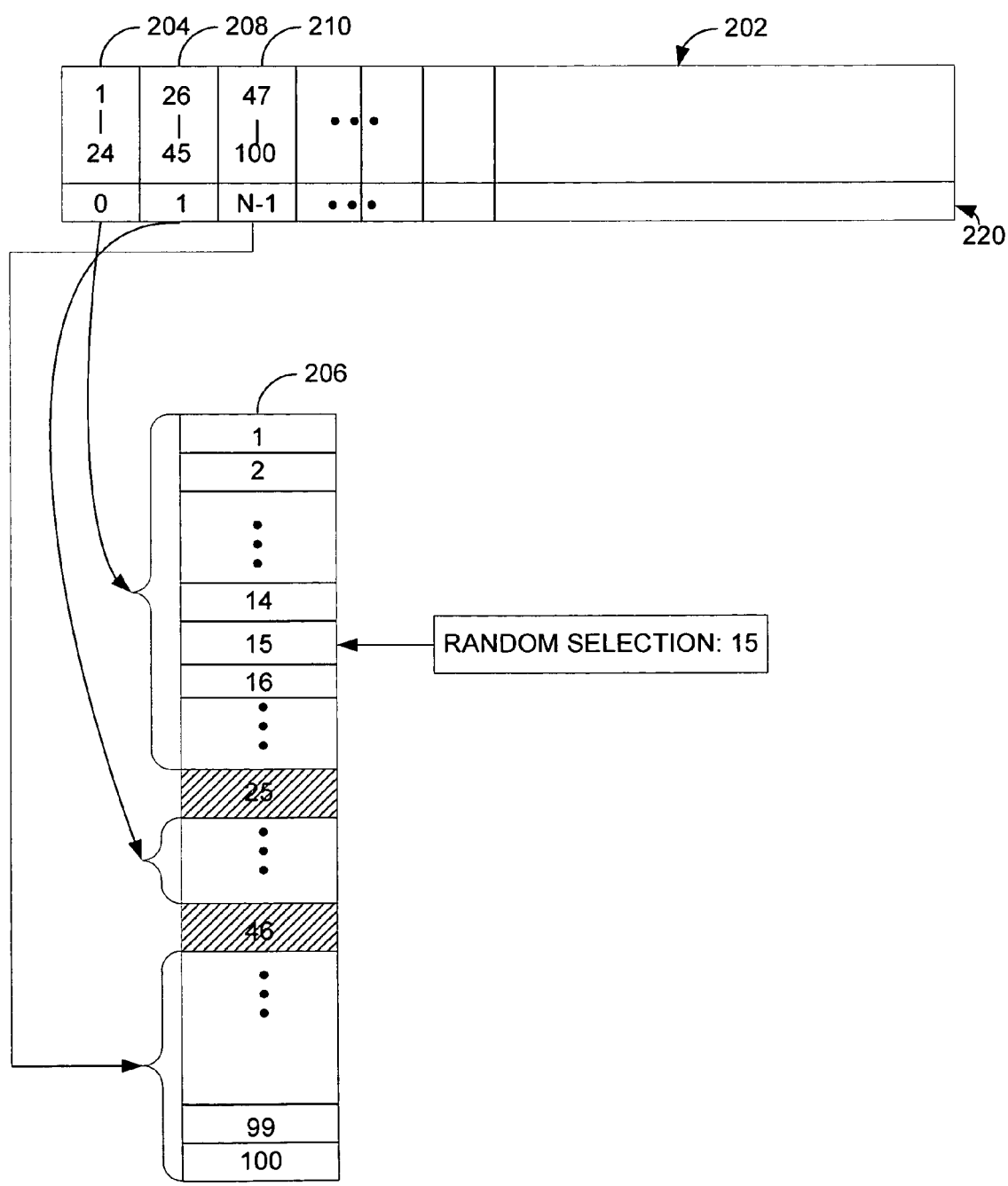

In an alternative embodiment, FIG. 2D illustrates a diagram with an index 220 having index values that may be added to the each of the packed blocks for sorting the packed blocks in a list. This index value is calculated by assigning 0 to the index of the first item in the list and then assigning the index of the N−1 element in the list plus the count of items in the N−1 element as the index of the Nth element. As an element is removed from the "packed array" structure, the index value is updated such that the values are always contiguous increasing numbers from 0 to the number of items in the list. While this may increase the memory requirements (e.g., to 1.5 times the requirement for a simple packed array) and CPU requirements after selection, it provides performance benefits when searching the packed array for the desired media file. It also makes it possible to perform a binary search on the packed blocks guaranteeing at most $O((\log_2 N)$ access to any element in the array 202.

Figure 2E:
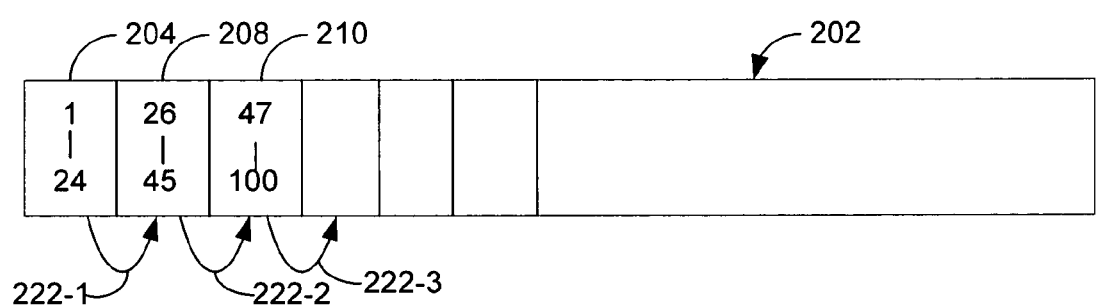

In an alternative embodiment especially suited to CRM devices where memory space is highly constrained, FIG. 2E illustrates a diagram describing the "packed array" structure is updated to include a pointer (e.g., pointers 222) to the next cell or block in the list. This chaining or linking implementation of each cell or block of the packed array enables each cell or block in the list to be independently allocated or released back to the system, thus providing for more optimal memory usage. While this requires a $O(N/2)$ search to locate the desired item in the "packed array," this alternative embodiment has the benefit of allowing the list to add or remove memory as playback progresses rather than requiring allocation of an array of elements. Alternate embodiments of the packed array structure may add additional pointers to make traversing the list more efficient. This data structure is commonly referred to as a skip list. For example an additional pointer may be added to the structure to point to every $10^{th}$ item in the list. This makes it possible to skip large uniform blocks of numbers more efficiently when searching the contents of the list.

To further illustrate the use of packed array 202, each of these N media files may be represented by an identifying value, such as a numerical value ranging from 0 to N−1. Each of the identifying value maps the numerical value to the actual media data about the media file stored in CRM 110, external media source 116, other attached storage mechanism, random access memory (RAM), in an external network server, or available only as network data sent to the device on demand.

To randomly select a media file from the list 206 to be played, a random number generator is employed to select an element from one of the defined sets of media files 108 to be rendered in one embodiment. For example as illustrated in FIG. 2A, there are 100 media files 108 to be rendered initially. The random number generator selects any random number between 0 and x−1 where x is the number of elements in the set of items still needing to be played, as illustrated as blocks 204, 208, and the like in FIG. 2C). In one example, this process may be performed using a function such as:

$$y = R \text{ and}( ) \bmod x$$

to locate the index of the media file from the defined set of media files to be rendered.

In one embodiment, the selected media file 108 is removed from the defined sets (e.g., one of the blocks 204 or 208). As such, the one or more sets are redefined, such as block 204 in FIG. 2A represent media files 108 1 to 100 while block 204 in FIG. 2B represents media files 108 1 to 24) to account for the media file selected for playback. As indicated above this may result in either the index or count of an existing media file in the sets being modified (if the removed item appears at the beginning or end of one of the packed array blocks), the addition of a new block to account for the removed item (as represented in the progression from FIG. 2A to 2C), or a block with a single entry being removed from the sets. In the embodiment where the index value is used, the indices will be updated to reflect the changes of removing one or more of the media files 108. Next, another media file 108 is randomly selected from the one or more redefined sets (e.g., as shown in FIGS. 2B and 2C).

In yet another embodiment, computing device 102 receives a plurality of media files 108 to be rendered. The MPA 104 defines one or more sets of media files 108 to be rendered, and each of the defined sets (e.g., blocks 204, or 208) representing one or more contiguous media files 108, i.e., files organized in a contiguous list. A media file 108 is rendered by randomly selecting the media file 108 from one of the defined sets to be rendered. The MPA 104 redefines the one or more sets of media files, and each of the redefined sets representing one or more remaining media files to be rendered. Another media file is rendered by randomly selecting the other media file from one of the redefined sets for rendering.

Figure 3:
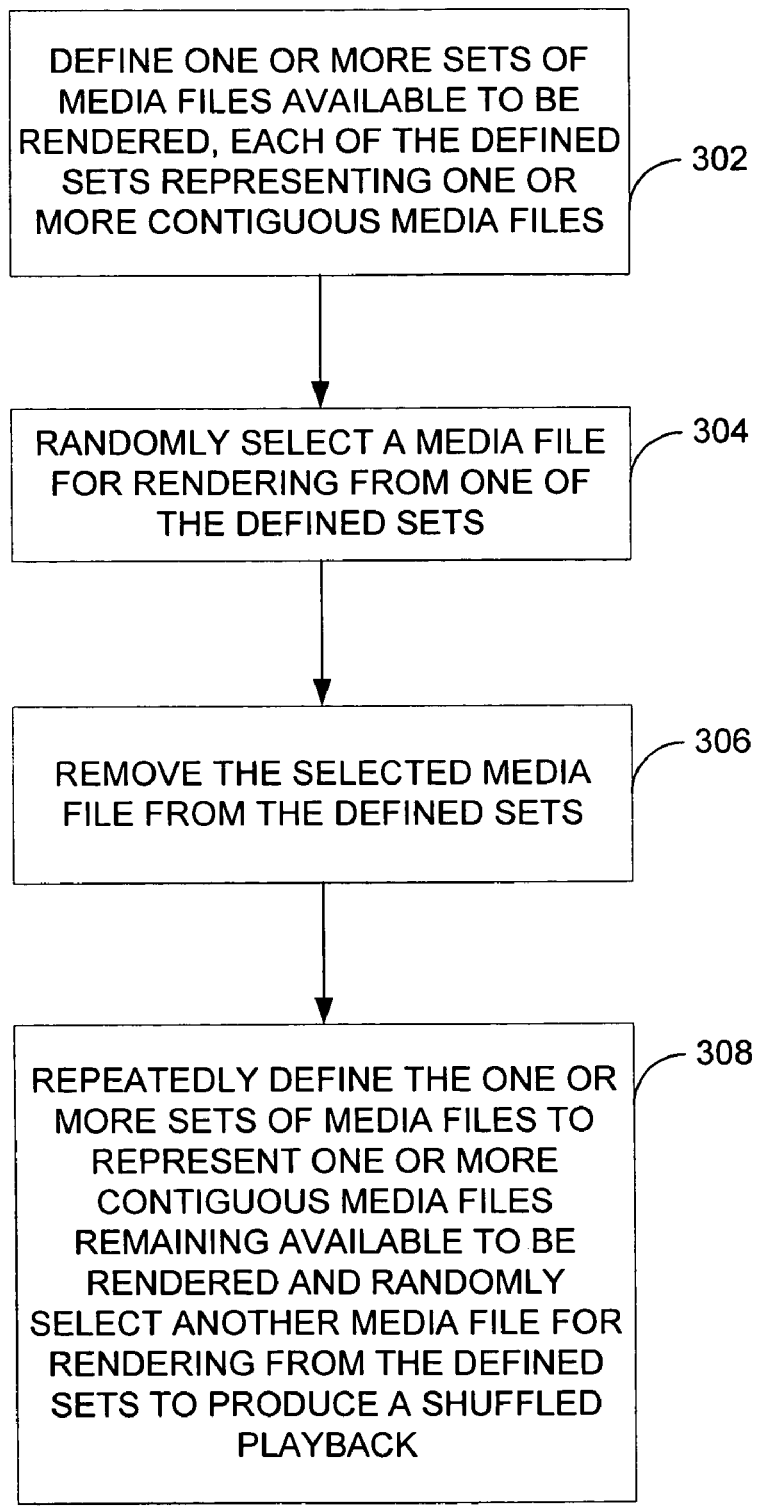
FIG. 3 is an exemplary flow chart illustrating operation of organizing a plurality media files for shuffled rendering of media files according to an embodiment of the invention.

FIG. 3 is a flow chart illustrating an operation of organizing media files for shuffled rendering. At 302, one or more sets of media files available to be rendered are defined. Each of the defined sets representing one or more contiguous media files. A media file is randomly selected from one of the defined sets at 304. At 306, the selected media file is removed from the defined sets. At 308, the one or more sets of media files is repeatedly redefined to represent one or more contiguous media files remaining available to be rendered. In an alternative embodiment, memory space in memory 112 is allocated for the defined sets or the redefined sets. In yet another embodiment, an index value is assigned to each element in the defined sets such that the index value is used to retrieve, in response to receiving a query from a user, the media files 108 based on the index value associated with each of the defined set. In addition, another media file is randomly selected for rendering from one of the redefined sets to produce a shuffled playback.

Figure 4:
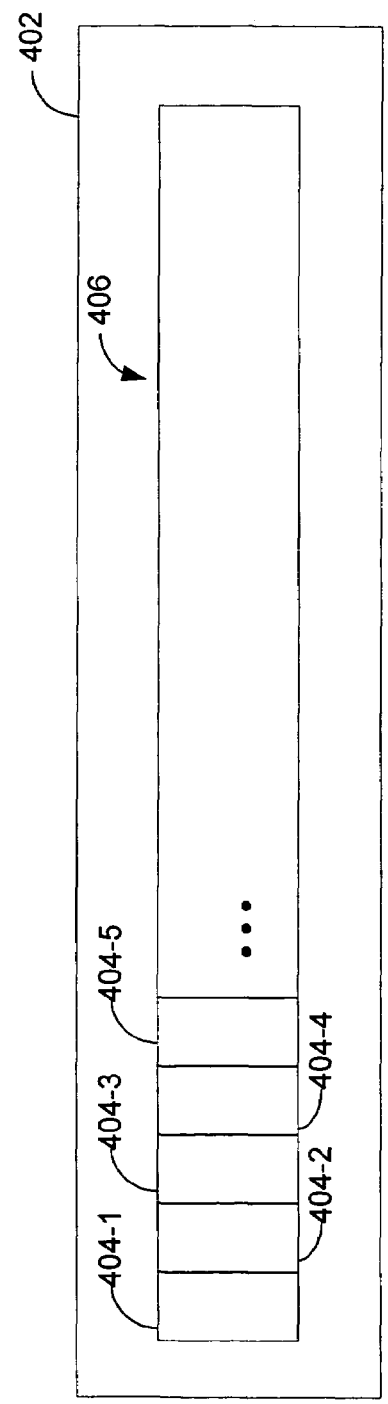
FIG. 4 is a diagram illustrating an exemplary computer-readable medium on which the invention may be stored.

FIG. 4 is a block diagram illustrating an exemplary computer-readable medium 402 on which the invention may be stored. The computer-readable medium 402 includes one or more media fields 404, each containing data representing a contiguous sequence of one or more media files available to be rendered. At least one of the media files is randomly selected for rendering to a user via a media player application 114. The media data fields exclude the at least one media file after rendering. The computer-readable medium 402 also includes a packed array 406 representing the one or more media fields 404. The packed array 406 has a maximum size corresponding to a total number of media files available to be rendered.

While the packed array (e.g., 202 in FIGS. 2A-2C or 406 in FIG. 4) is described and discussed as implemented in embodiments of the invention, other types of data structures performing similar functions as the packed array may be used without departing from the scope of the invention.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above system and method without departing from the scope of the invention, it is intended that all matter contained in the above description and shown in the accompanying drawings shall be interpreted as illustrative and not in a limiting sense.

What is claimed is:

1. A computer-readable medium having stored thereon a data structure representing a plurality of media files to be rendered, said computer-readable medium comprising:

one or more media fields each containing data representing a contiguous sequence of one or more media files available to be rendered, at least one of said media files being randomly selected for rendering to a user via a media player application, said media data fields excluding the at least one media file after rendering, said one or more fields representing the contiguous sequence of the one or more media files sequentially according to a numerical value starting from 0 to N−1, wherein N is a total number of the media files in the defined sets; and a packed array having pack array elements for representing the one or more media fields, each of said pack array element including two numerical values representing all contiguous media files in each set of media files that have not been randomly selected for rendering, said packed array having a maximum size corresponding to a total number of media files available to be rendered.

2. The computer-readable medium of claim 1, further comprising an index field containing data assigning an index value to each of the media files represented in the media fields, said index value, said index value being used to identify the media files in response to a query from a user for retrieving the media files.

3. The computer-readable medium of claim 1, wherein at least one of the media files is stored in a memory-constrained device, and wherein the media fields are stored in another memory-constrained device.

4. The computer-readable medium of claim 1, wherein each of the one or more media fields is linked to one of the other media fields.

5. The computer-readable medium of claim 1, wherein the size of the packed array depends on the number of contiguous sequences of one or more media files available to be rendered.

6. A method of rendering a plurality of media files in a shuffled playback, said method comprising:

defining one or more sets of media files to be rendered, each of said defined sets representing one or more contiguous media files, said one or more contiguous media files in the defined sets comprising one or more media files being listed sequentially according to a numerical value staffing from 0 to N−1, wherein N is a total number of the media files in the defined sets, wherein the defined sets are represented by a packed array having one or more packed array elements, said each pack array element including two numerical values representing all contiguous media files in each defined set;

rendering a media file to a user via a media player application, said rendered media file being randomly selected from one of the defined sets;

redefining the one or more sets of media files to be rendered, each of said redefined sets representing one or more contiguous media files remaining to be rendered; and rendering another media file to the user via the media player application, said other rendered media file being randomly selected from one of the redefined sets.

7. The method of claim 6, further comprising removing the randomly selected media files from the respective defined and redefined sets after rendering.

8. The method of claim 6, wherein the packed array has a maximum size corresponding to a total number of media files available to be rendered.

9. The method of claim 8, further comprising allocating memory for the packed array depending on the size of the packed array, and further comprising allocating memory for assigning an index value for each of the elements in the packed array.

10. The method of claim 9, further comprising retrieving, in response to receiving a query from a user, the one or more media files for rendering based on the index value associated with each of the defined set, and further comprising executing the media player application on a memory-constrained computing device.

11. The method of claim 6, further comprising linking packed elements in a memory for more optimal memory usage.

12. The method of claim 6, further comprising generating a random number to randomly select the media file to be rendered, said generated random number identifying one of the media files from one of the defined sets of media files, and further comprising generating another random number to randomly select the other media file to be rendered, said generated other random number identifying one of the media files from one of the redefined sets of media files.

13. A computerized method of organizing media files for rendering according to a shuffled playback, said computerized method comprising:

defining one or more sets of media files available to be rendered, each of said defined sets representing one or more contiguous media files, said one or more contiguous media files in the defined sets comprising one or more media files being listed sequentially according to a numerical value starting from 0 to N−1, wherein N is a total number of the media files in the defined sets, wherein the defined sets are represented by a packed array having one or more packed array elements, said each pack array element including two numerical values representing all contiguous media files in each defined set;

randomly selecting a media file for rendering from one of the defined sets;

removing the selected media file from the defined sets; and repeatedly defining the one or more sets of media files to represent one or more contiguous media files remaining available to be rendered and randomly selecting another media file for rendering from the defined sets to produce a shuffled playback, wherein the repeatedly defined the one or more sets of media files are represented by the packed array.

14. The computerized method of claim 13, wherein the packed array has a maximum size corresponding to a total number of media files available to be rendered.

15. The computerized method of claim 14, further comprising allocating memory for the packed array depending on the size of the packed array.

16. The computerized method of claim 13, further comprising allocating memory for assigning an index value for each of the defined sets.

17. The computerized method of claim 13, further comprising linking packed elements in a memory for more optimal memory usage.

18. The computerized method of claim 16, further comprising retrieving, in response to receiving a query from a user, the media files based on the index value associated with each of the defined set.

19. The computerized method of claim 13, wherein at least one of the media files is stored in a memory-constrained device, and wherein randomly selecting comprises generating a random number, said generated random number identifying one of the media files from one of the defined sets of media files.

20. The computerized method of claim 13, wherein one or more computer-readable media have computer-executable instructions for performing the computerized method recited in claim 13.

* * * * *